(12) United States Patent
Jeon

(10) Patent No.: US 7,843,543 B2
(45) Date of Patent: Nov. 30, 2010

(54) LIQUID CRYSTAL DISPLAY DEVICE

(75) Inventor: Mu-kyung Jeon, Suwon (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 150 days.

(21) Appl. No.: 12/169,355

(22) Filed: Jul. 8, 2008

(65) Prior Publication Data

US 2009/0073365 A1    Mar. 19, 2009

(30) Foreign Application Priority Data

Sep. 14, 2007    (KR) .................. 10-2007-0093631

(51) Int. Cl.
    *G02F 1/1343* (2006.01)
(52) U.S. Cl. ..................................... 349/141
(58) Field of Classification Search ............... None
    See application file for complete search history.

(56) References Cited

U.S. PATENT DOCUMENTS

2006/0268211 A1* 11/2006 Chen .......................... 349/141
2007/0052899 A1*  3/2007 Lin et al. ..................... 349/141
2008/0198318 A1*  8/2008 Lee ............................. 349/141

FOREIGN PATENT DOCUMENTS

| KR | 1998-0003752 | 3/1998 |
| KR | 10-2004-0105435 | 12/2004 |
| KR | 10-2005-0001954 A | 1/2005 |
| KR | 1020050001742 A | 1/2005 |

OTHER PUBLICATIONS

KIPO Notice of Allowance dated Jan. 29, 2009 for priority Korean application 10-2007-0093631, noting relevance of reference listed in this IDS.
Korean Patent Abstracts, Publication No. 1020040105435 A; Date of Publication: Dec. 16, 2004; in the name of Gyo Seop Choo, et al.

* cited by examiner

*Primary Examiner*—Sung H Pak
(74) *Attorney, Agent, or Firm*—Christie, Parker & Hale, LLP

(57) ABSTRACT

A liquid crystal display device is provided including gate lines on a substrate. Data lines cross the gate lines. A first insulation layer is between the gate lines and the data lines. Pixel electrodes are in pixel regions bounded by crossing portions of the gate lines and the data lines. A common electrode is on the second insulation layer. The common electrode partially covers the pixel regions and the data lines. A second insulation layer is between the pixel electrodes and the common electrode. Holes are in the common electrode to expose the second insulation layer. The holes are at overlapping portions of the common electrode and the data lines.

14 Claims, 3 Drawing Sheets

LIQUID CRYSTAL DISPLAY DEVICE

CROSS-REFERENCE TO RELATED APPLICATION

This application claims priority to and the benefit of Korean Patent Application No. 10-2007-0093631, filed on Sep. 14, 2007, in the Korean Intellectual Property Office, the entire content of which is incorporated herein by reference.

BACKGROUND

1. Field of the Invention

The present invention relates to a liquid crystal display device, and more particularly to a liquid crystal display device with lower power consumption.

2. Discussion of Related Art

A liquid crystal display displays images by controlling the light transmittance of a liquid crystal with dielectric anisotropy. The liquid crystal display device includes a liquid crystal panel where liquid crystal cells are arranged in a matrix and a driving circuit for driving the liquid crystal panel.

The liquid crystal panel displays predetermined images corresponding to the light transmittance of each liquid crystal cell. A liquid crystal panel can be categorized into a vertical electric field application type or a horizontal electric field application type according to a direction of electric field for driving a liquid crystal.

The vertical electric field application type liquid crystal panel drives a twisted nematic (TN) liquid crystal by vertical electric field formed between a common electrode and a pixel electrode disposed to oppose each other on an upper substrate and a lower substrate. The vertical electric field application type liquid crystal panel has an advantage of a good aperture ratio but a disadvantage of a narrow viewing angle.

The horizontal electric field application type liquid crystal panel drives an in-plane switch (IPS) liquid crystal by utilizing horizontal electric field between a pixel electrode and a common electrode disposed to be parallel with each other on a lower substrate. Such a horizontal electric field application type liquid crystal panel has an advantage of a wide viewing angle but a disadvantage of low aperture ratio and transmittance.

Recently, in order to solve the disadvantage of the horizontal electric field application type liquid crystal panel, a fringe field switching (hereinafter, referred to as "FFS") type liquid crystal panel has been proposed, which operates by utilizing a fringe field. The FFS type liquid crystal panel includes a common electrode and a pixel electrode having an insulating layer therebetween. Such a FFS type liquid crystal panel drives a liquid crystal between the upper and lower substrates by utilizing the fringe field between the common electrode and the pixel electrode, thereby improving aperture ratio and transmittance.

The common electrode of such a FFS type liquid crystal display device is formed to cover an effective display region of the liquid crystal panel on the insulating layer. However, if the common electrode is formed to cover the effective display region of the liquid crystal panel, there is high capacitance in an overlapped region with a data line. The high capacitance in the overlapped region with the data line causes the liquid crystal panel to have higher power consumption.

SUMMARY OF THE INVENTION

An aspect of an embodiment of the present invention is directed toward a liquid crystal display device with lower power consumption. According to an exemplary embodiment of the present invention, a liquid crystal display device includes gate lines on a substrate and data lines crossing the gate lines. A first insulation layer is between the gate lines and the data lines. Pixel electrodes are in pixel regions bounded by crossing portions of the gate lines and the data lines. A common electrode partially covers the pixel regions and the data lines. A second insulation layer is between the pixel electrodes and the common electrode. Holes are in the common electrode to expose the second insulation layer. The holes are at overlapping portions of the common electrode and the data lines.

In one exemplary embodiment, the pixel regions include thin film transistors coupled to the gate lines, to the data lines, and to the pixel electrodes. The holes are positioned between the thin film transistors.

In one exemplary embodiment, each of the holes has a width narrower than a width a corresponding one of the data lines.

In one exemplary embodiment, the width of each of the holes is at least about 1 μm less than the width of the corresponding one of the data lines.

In one exemplary embodiment, side edge of each of the data lines overlap with the common electrode by at least about 1 μm and a central portion of each of the data lines overlap with a corresponding one of the holes.

In one exemplary embodiment, the common electrode comprises at least one slit hole in portions overlapping the pixel electrodes.

In one exemplary embodiment, an additional substrate is positioned to face the substrate and a liquid crystal injected between the additional substrate and the substrate and driven by utilizing a fringe field between the common electrode and the pixel electrodes.

According to another exemplary embodiment of the present invention, a liquid crystal display device is provided including pixel electrodes, data lines supplying signals to the pixel electrodes, a common electrode, an insulating layer between the pixel electrodes and the common electrode, and at least one hole in the common electrode at an overlapping portion of the common electrode and the data electrodes.

In one exemplary embodiment, a width of the at least one hole is narrower than a width of an adjacent one of the data lines.

According to an exemplary embodiment of the present invention, a liquid crystal display device is provided including pixel electrodes and data lines supplying signals to the pixel electrodes. An insulating layer is on the pixel electrodes and the data lines. A common electrode is on the insulation layer. Holes are in the common electrode in portions adjacent to and covering the data lines.

In one exemplary embodiment, a width of each of the holes is narrower than a width of the adjacent data lines.

In one exemplary embodiment, gate lines are on a lower substrate. The insulation layer is on the lower substrate and covers the gate lines. Thin film transistors are coupled to the gate lines, to the data lines, and to the pixel electrodes. The holes are positioned between the thin film transistors.

In one exemplary embodiment, a width of each of the holes is at least 1 μm less than the width of the adjacent data lines.

In one exemplary embodiment, a width of each of the holes is at least 2 μm less than the width of the adjacent data lines.

In one exemplary embodiment, side edges of each of the data lines overlap with the common electrode by at least 1 μm and central portions of the data lines overlap with the holes.

In one exemplary embodiment, the common electrode includes at least one slit hole in portions overlapping the pixel electrodes.

In one exemplary embodiment, an upper substrate is positioned to face the lower substrate, and a liquid crystal injected between the upper substrate and the lower substrate.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION OF EXEMPLARY EMBODIMENTS

Figure 1:
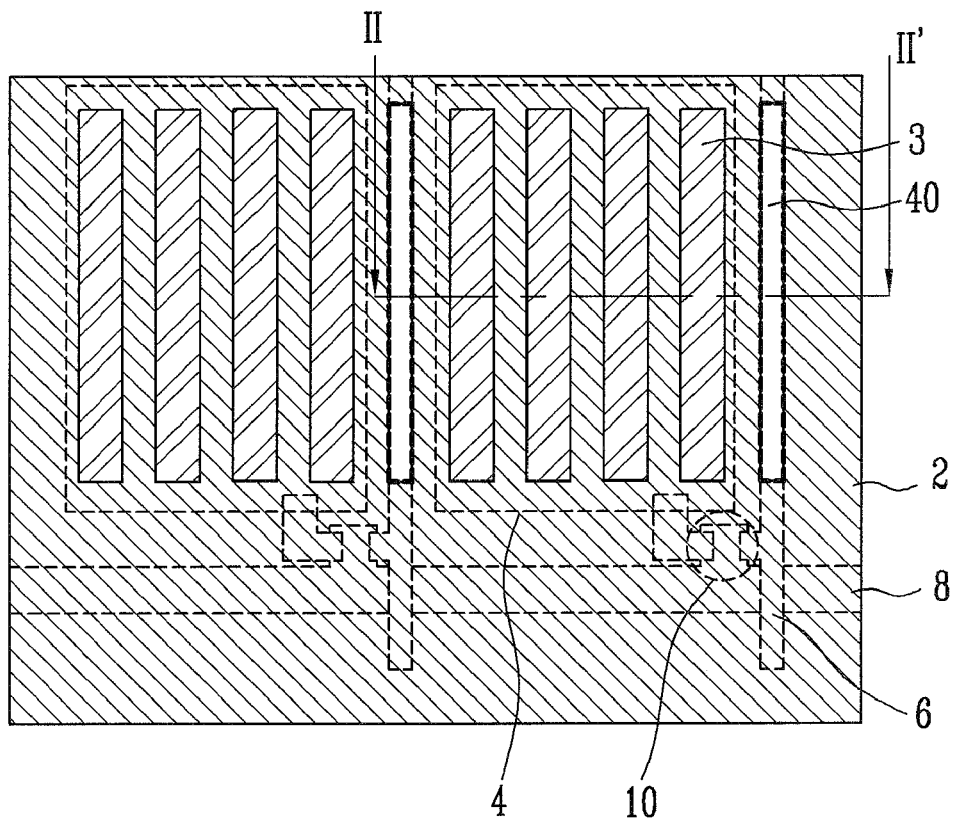
FIG. 1 is a plan view schematically showing a liquid crystal display device according to an embodiment of the present invention.

In the following detailed description, only certain exemplary embodiments of the present invention are shown and described, by way of illustration. As those skilled in the art would realize, the described embodiments may be modified in various different ways, all without departing from the sprit or scope of the present invention. Accordingly, the drawings and description are to be regarded as illustrative in nature and not restrictive. In addition, when an element is referred to as being "on" another element, it can be directly on another element or be indirectly on another element with one or more intervening elements interposed therebetween. Also, when an element is referred to as being "connected to" another element, it can be directly connected to another element or be indirectly connected to another element with one or more intervening elements interposed therebetween. Hereinafter, like reference numerals refer to like elements.

Figure 2:
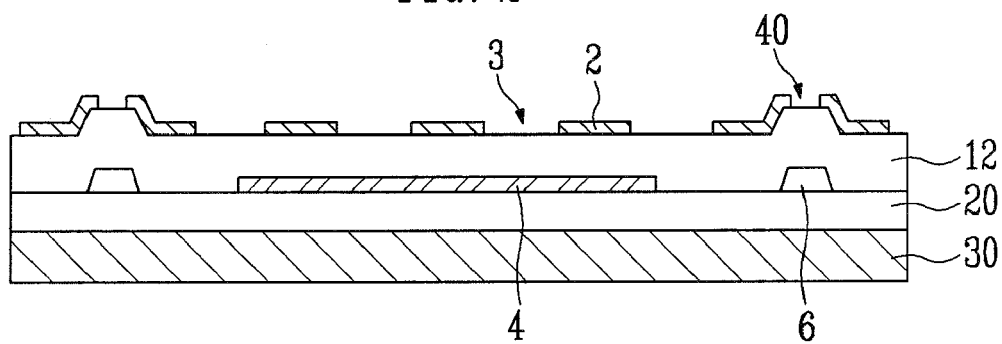
FIG. 2 is a cross-sectional view schematically showing the liquid crystal display device taken along line II-II' shown in FIG. 1.

FIG. 1 is a plan view schematically showing a FFS type liquid crystal display device according to an embodiment of the present invention and FIG. 2 is a cross-sectional view schematically showing the liquid crystal display device taken along line II-II' of FIG. 1.

Referring to FIGS. 1 and 2, the liquid crystal display device includes data lines 6 and gate lines 8 crossing the data lines 6 on a lower substrate 30, thin film transistors 10 positioned in pixel regions bound by or defined by crossing portions of the data lines 6 and the gate lines 8, pixel electrodes 4 formed in the pixel regions to allow the pixel electrodes 4 to couple to the thin film transistors 10, and a common electrode 2 formed with the pixel electrodes 4 to form fringe fields in the pixel regions.

The gate lines 8 supply gate signals from a gate driver to the thin film transistors 10. The gate lines 8 are integrally formed with the gate electrodes of the thin film transistors 10.

The data lines 6 supply data signals from a data driver to the thin film transistors 10. The data lines 6 are integrally formed with the source/drain electrodes of the thin film transistors 10. As one example, the data lines 6 may be formed on different layers from the gate lines 8, with a first insulating layer 20 therebetween.

The thin film transistors 10 supply the data signals, which are supplied to the data lines, to the pixel electrodes 4 in response to the gate signals supplied to the gate lines 8. The thin film transistors 10 include gate electrodes coupled to the gate lines 8, source electrodes coupled to the data lines 6, and drain electrodes coupled to the pixel electrodes 4.

The pixel electrodes 4 are formed in each pixel region to allow them to couple to the thin film transistors 10. Also, the pixel electrodes 4 are formed on an insulating layer 20. The pixel electrodes 4 receive the data signals via the thin film transistors 10.

The common electrode 2 is formed to face the pixel electrodes 4 on a second insulating layer 12. The common electrode 2 is formed to cover effective display regions where the pixel regions are formed, thereby forming the fringe fields. If the pixel electrodes 4 receiving the data signals and the common electrode 2 receiving a common voltage form the fringe fields, liquid crystals positioned between the common electrode 2 and the upper substrate rotates. Consequently, the light transmittance transmitting the pixel regions is changed according to the rotation degree of the liquid crystal, implementing gray levels. Meanwhile, one region of the common electrode 2 overlapped with the pixel electrodes 4 is formed with at least one slit hole 3.

In an embodiment of the present invention, the common electrode 2 in the regions where the common electrode 2 and the data lines 6 are overlapped is formed with holes 40. Actually, the holes 40 are overlapped with the data lines 6 as well as formed between the thin film transistors 10, and formed to expose the second insulating layer 12. Herein, if the holes 40 are positioned between the thin film transistors 10, only capacitance can be reduced without a problem of reliability. In other words, if the holes 40 are formed in the common electrode 2, the capacitance between the common electrode 2 and the data lines 6 can be minimized or reduced, thereby making it possible to lower power consumption.

Figure 3:
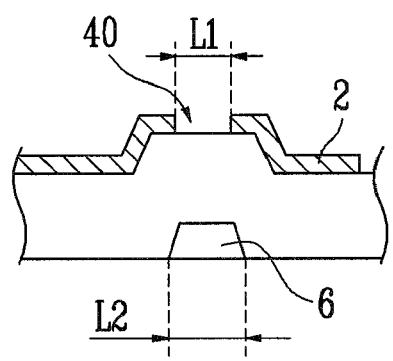
FIG. 3 is a view schematically showing the hole shown in FIG. 1.

FIG. 3 is a view schematically showing the width of the hole formed in the common electrode. Referring to FIG. 3, the width L1 (width direction) of the hole 40 formed in the common electrode 2 is formed to be narrower than the width L2 of the data 6 (the width direction length of the data line 6).

If the hole 40 is formed in the common electrode 2, the light supplied from the backlight is emitted to the outside, resulting in light leakage.

Figure 4A:
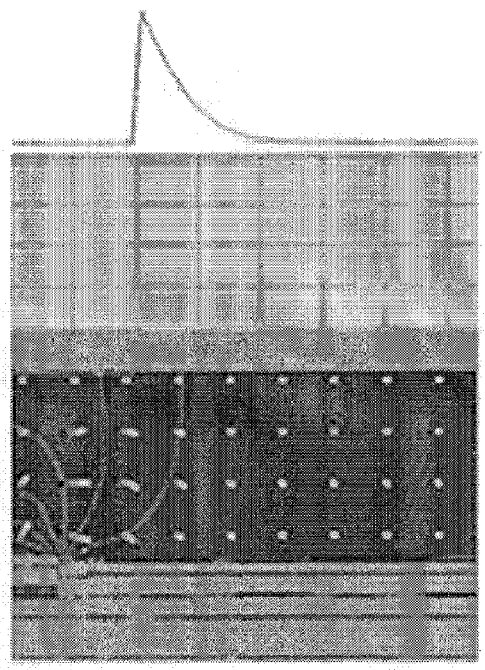
FIGS. 4A to 4D are graphs showing light leakage corresponding to the width of the hole shown in FIG. 3.
Figure 4B:
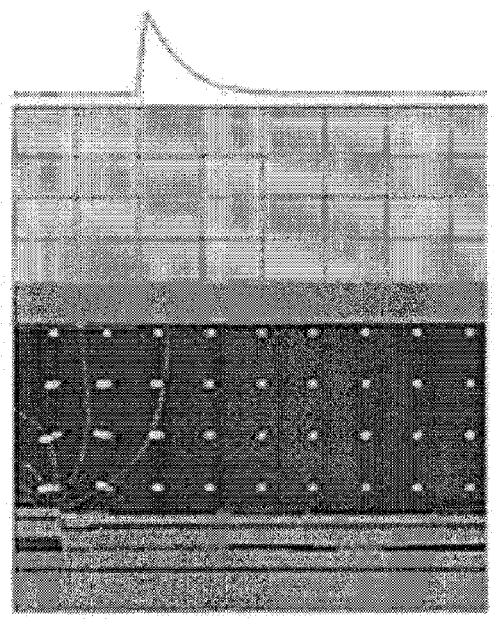

For example, if the width L2 of the data line 6 is set to 3 μm and the width L1 of the hole 40 is set to 4 μm, a large amount of light is emitted to the outside as shown in FIG. 4a. If the width L2 of the data line 6 is set to 3 μm and the width L1 of the hole 40 is set to 3 μm, less light is emitted as shown in FIG. 4b.

Figure 4C:
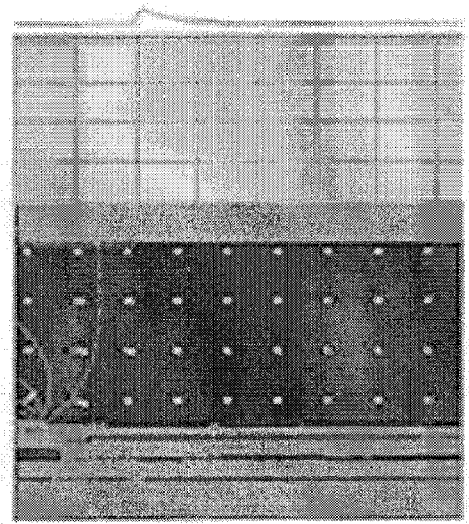
Figure 4D:
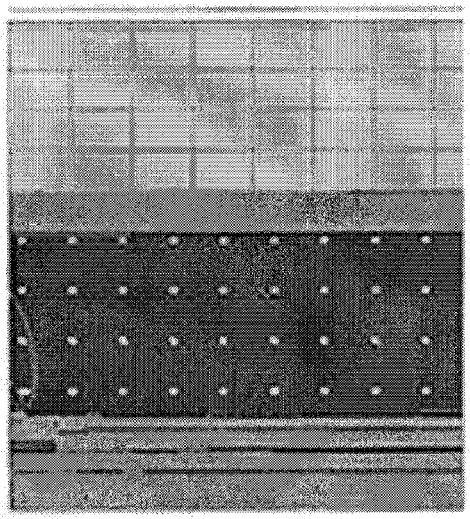

However, if the width L1 of the hole 40 is formed to be narrower than the width L2 of the data line 6, the light leakage can be substantially reduced or prevented. For example, if the width L2 of the data line 6 is set to 3 μm and the width L1 of the hole 40 is set to 2 μm, very little light is emitted to the outside as shown in FIG. 4C. And, if the width L1 of the hole 40 is set to 1 μm, almost no light is emitted to the outside as shown in FIG. 4D.

In other words, in order to reduce or to prevent a light leakage phenomenon in an exemplary embodiment of the present invention, the width L1 of the hole 40 is formed to be narrower than the width L2 of the data line 6. For example, the width L1 of the hole 40 may be formed to be narrower by at least about 1 μm than the width L2 of the data line 6. Also, in order to substantially prevent the light leakage phenomenon in the present invention, the width L1 of the hole 40 may be formed to be narrower by about 2 μm than the width L2 of the data line 6. In this case, both edges of the data line 6 are overlapped with the common electrode 2 by about 1 μm (or by 1 μm) and the central portion of the data line 6 is overlapped with the hole 40.

A the liquid crystal display device according to an exemplary embodiment of the present invention forms the hole to expose the data electrode in the portion where the common electrode and the data electrode are overlapped, making it possible to reduce the capacitance between the common electrode and the data electrode. Therefore, power consumption can be lowered.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A liquid crystal display device comprising:
    gate lines on a substrate;
    data lines crossing the gate lines;
    a first insulation layer between the gate lines and the data lines;
    pixel electrodes in pixel regions bounded by crossing portions of the gate lines and the data lines;
    a common electrode partially covering the pixel regions and the data lines;
    a second insulation layer between the pixel electrodes and the common electrode; and
    holes in the common electrode to expose the second insulation layer, the holes being at overlapping portions of the common electrode and the data lines, each of the holes having a width narrower than a width of a corresponding one of the data lines.

2. The liquid crystal display device as claimed in claim 1, wherein:
    the pixel regions comprise thin film transistors coupled to the gate lines, to the data lines, and to the pixel electrodes, and
    the holes are positioned between the thin film transistors.

3. The liquid crystal display device as claimed in claim 1, wherein the width of each of the holes is at least about 1 μm less than the width of the corresponding one of the data lines.

4. The liquid crystal display device as claimed in claim 1, wherein side edges of each of the data lines overlap with the common electrode by at least about 1 μm and a central portion of each of the data lines overlap with a corresponding one of the holes.

5. The liquid crystal display device as claimed in claim 1, wherein the common electrode comprises at least one slit hole in portions overlapping the pixel electrodes.

6. The liquid crystal display device as claimed in claim 1, further comprising an additional substrate positioned to face the substrate and a liquid crystal injected between the additional substrate and the substrate and driven by utilizing a fringe field between the common electrode and the pixel electrodes.

7. A liquid crystal display device comprising:
    pixel electrodes;
    data lines for supplying signals to the pixel electrodes;
    a common electrode;
    an insulating layer between the pixel electrodes and the common electrode; and
    at least one hole in the common electrode at an overlapping portion of the common electrode and the data lines, a width of the at least one hole being narrower than a width of a corresponding one of the data lines.

8. A liquid crystal display device comprising:
    pixel electrodes;
    data lines for supplying signals to the pixel electrodes;
    an insulation layer on the pixel electrodes and the data lines;
    a common electrode on the insulation layer; and
    holes in the common electrode in portions corresponding to and overlapping the data lines, each of the holes having a width narrower than a width of a corresponding one of the data lines.

9. The liquid crystal display device as claimed in claim 8, further comprising:
    gate lines on a lower substrate, the insulation layer being on the lower substrate and covering the gate lines; and
    thin film transistors coupled to the gate lines, to the data lines, and to the pixel electrodes,
    wherein the holes are positioned between the thin film transistors.

10. The liquid crystal display device as claimed in claim 8, wherein the width of each of the holes is at least 1 μm less than the width of the corresponding one of the data lines.

11. The liquid crystal display device as claimed in claim 8, wherein the width of each of the holes is at least 2 μm less than the width of the corresponding one of the data lines.

12. The liquid crystal display device as claimed in claim 11, wherein side edges of each of the data lines overlap with the common electrode by at least 1 μm and central portions of the data lines overlap with the holes.

13. The liquid crystal display device as claimed in claim 8, wherein the common electrode includes at least one slit hole in portions overlapping the pixel electrodes.

14. The liquid crystal display device as claimed in claim 9, further comprising:
    an upper substrate positioned to face the lower substrate; and
    a liquid crystal injected between the upper substrate and the lower substrate.

* * * * *